(12) United States Patent
Berrett et al.

(10) Patent No.: US 11,127,033 B2
(45) Date of Patent: Sep. 21, 2021

(54) PROGRAMMATIC ADVERTISING PLATFORM

(71) Applicant: A4 Media & Data Solutions, LLC, Long Island City, NY (US)

(72) Inventors: Reed Berrett, West Jordan, UT (US); Derek Mattsson, Salt Lake City, UT (US); Chris Satovick, Salt Lake City, UT (US); Trisha Schepers, Byron Center, MI (US)

(73) Assignee: A4 Media & Data Solutions, LLC, Long Island City, NY (US)

( * ) Notice: Subject to any disclaimer, the term of this patent is extended or adjusted under 35 U.S.C. 154(b) by 0 days.

(21) Appl. No.: 16/773,877

(22) Filed: Jan. 27, 2020

(65) Prior Publication Data

US 2020/0160375 A1 May 21, 2020

Related U.S. Application Data

(63) Continuation of application No. 14/986,358, filed on Dec. 31, 2015, now Pat. No. 10,546,317.

(51) Int. Cl.
*G06Q 30/00* (2012.01)
*G06Q 30/02* (2012.01)
*H04N 21/81* (2011.01)

(52) U.S. Cl.
CPC ..... *G06Q 30/0244* (2013.01); *G06Q 30/0276* (2013.01); *H04N 21/812* (2013.01)

(58) Field of Classification Search
None
See application file for complete search history.

(56) References Cited

U.S. PATENT DOCUMENTS

| 8,365,213 B1 * | 1/2013 | Orlowski | H04H 60/66 |
| | | | 725/13 |
| 2007/0271518 A1 * | 11/2007 | Tischer | H04N 21/44222 |
| | | | 715/744 |

(Continued)

OTHER PUBLICATIONS

STIC EIC 3600 Search Report for U.S. Appl. No. 16/773,877 dated Mar. 11, 2021. (Year: 2021).*

(Continued)

*Primary Examiner* — Matthew T Sittner
(74) *Attorney, Agent, or Firm* — Sterne, Kessler, Goldstein & Fox P.L.L.C.

(57) ABSTRACT

A system and method provides for the use of a proprietary platform to predict impressions and to predict and design ad campaigns. Specifically, a proprietary programmatic advertisement platform correlates television programming asset sources with actual viewing behavior of broadcasts associated with the television programming assets and ad content associated with the ad campaign. The correlation produces a predicted performance value used to generate an ad campaign. For instance, the invention enables television programming asset sources and viewership information providers to communicate with the programmatic advertisement platform in a way that adds value to or otherwise facilitates the valuation of the television programming asset sources in context of the particular ad. Thus, the programmatic advertisement platform delivers improved performance and lower effective cost of television ad campaigns by using automation for simplification and advanced targeting algorithms to reach desired audiences more efficiently.

20 Claims, 19 Drawing Sheets

(56) References Cited

U.S. PATENT DOCUMENTS

| | | | |
|---|---|---|---|
| 2008/0052150 A1 | 2/2008 | Grouf | |
| 2008/0250447 A1 | 10/2008 | Rowe | |
| 2012/0023522 A1 | 1/2012 | Anderson | |
| 2013/0110947 A1 | 5/2013 | Boukadakis | |
| 2013/0151534 A1 | 6/2013 | Luks | |
| 2015/0066626 A1* | 3/2015 | Farahat | G06Q 30/0242 705/14.41 |
| 2016/0019101 A1 | 1/2016 | Steelberg | |
| 2016/0117719 A1* | 4/2016 | Hood | H04N 21/2547 705/14.42 |
| 2017/0193547 A1 | 7/2017 | Berrett | |

OTHER PUBLICATIONS

IP.com Search Strategy dated Mar. 9, 2021. (Year: 2021).*

STIC EIC 3600 Search Report for parent U.S. Appl. No. 14/986,358 (similar claims) dated Jun. 30, 2019. (Year: 2019).*

STIC EIC 3600 Search Report for parent U.S. Appl. No. 14/986,358 (similar claims) dated Aug. 30, 2018. (Year: 2018).*

Product: The Man Behind the Curtain Does Matter—Oct. 23, 2014, pp. 1-4 http://clypd.com/product-the-man-behind-the-curtain-does-matter/Captured: Feb. 4, 2016.

Placemedia Introduces Industry Leading Self-Serve Portal for Easy Television Planning and Buying—Sep. 2013, pp. 1-3 http://www.prnewswire.com/news-releases/placemedia-introduces-industry-leading-self-serve-portal-for-easyelevision-planning-and-buying-225329181.html Captured: Feb. 4, 2016.

Placemedia Expands Partnership with Rentrak to Bring Psychographic Data to Programmatic Buying on Linear Television—May 1, 2014, pp. 1-2 http://www.prnewswire.com/news-releases/placemedia-expands-partnership-with-rentrak-to-bring-pyschographic-data-to-programmatic-buying-on-linear-television-257569411.html Captured: Feb. 4, 2016.

Rovi Introduces Audience Management Solutions to Optimize Multi-Screen TV Advertising and Promotions—Jan. 17, 2014. pp. 1-3 http://www.rovicorp.com/company/press-releases/2014/1/7/audience-management-solutions-and-to-optimize-multi-screen-tv-ad.html Captured: Feb. 4, 2016.

* cited by examiner

| Advertisers | | | + Add Advertiser —— 605 |
|---|---|---|---|
| Advertiser | Contact | Email | Actions —— 604 |
| Amanda Test | n/a | na@na.com | |
| AOL | Dan Ackerman | dan.ackerman@teamaol.com | |
| Arizona Office of Tourism | NA | NA@NA.com | |

Create Advertiser.

Advertiser Information

606 —
- Advertiser*
- Account Executive*
- Agency
- Demo Data Provider*
- Address 1*
- Address 2
- City
- State* [Select ▼]
- Zip*
- Phone*
- Fax
- Contact Name*
- Contact Title
- Contact Email*
- Contact Phone*
- Contact Mobile

[Add Advertiser] —— 607

Creating an advertiser is easy! Just fill out this form to the left. Remember to enter all required(*) information. You can always edit an advertiser once they have been created.

FIGURE 9A placemedia

| HOME | CAMPAIGN | COPY | CLIENTS | SITE | Welcome | Log off |
| welcome | plan | manage | manage | manage | |

901 — 902 — 903 — 904 — 905

Account & Campaign Info

- Campaign*: [ ]
- Agency*: [Select Agency ▼]
- Advertiser*: [Select Advertiser ▼]
- Brand*: [Select Brand ▼]
- Estimate ID: [ ]
- Budget*: [ ]
- CPM*: [ ]
- State*: [Select ▼]
- National Nets Only: ☐
- % Evenly Distributed: [Platform decision day of week distribution ▼]
- No Even Distribution: [Leave all cash distribution dates in place ▼]
- Spot Length: [30 ▼]
- Notes: [ ◀ ▶ ]

906

908 — Days & Dayparts

- Start Date*: [ ]
- End Date*: [ ]
- Hiatus Weeks: [ ]

Days of the Week
- ☑ Monday  ☑ Tuesday  ☑ Wednesday  ☑ Thursday
- ☑ Friday  ☑ Saturday  ☑ Sunday

910

Creating an advertiser is easy!
Just fill out this form to the left.
Remember to enter all required(*)
information. You can always edit an
advertiser once they have been created.

909 — Audience & Targets

Primary Target* A18-24

Targets

914 —

AEN
AHC
AJAM
AMC
APL
BECA
BET
BRVO
BTN
BTV
CBSS
CC
CMB
CMT
CNB
CNN
CTRC
DAM
DISC
DIY
DXD
ENN
ENT
ESNU
ESP2
ESPN
ESQ
FAM
FRM me
$74,999

915 — Ne  Weights 916
917

Scale        Weight  Dayparts  Actions
0   25   50    0       7

Ca  Review

Calculate Campaign

---

Exclusions

Genres

918 —
Animation, Children & Teen
Arts & Entertainment
Broadcast Major
Broadcast Other
Cooking
Family
International
Learning
Lifestyle, How To Excluded Genre
Hispanic/Latino

>>
>
<
<<

Networks
A&N
AHC
AJAM
AMC
APL
BBCA
BET
BRVO
BTN

Excluded Networks

>>
>
<
<<

Save Exclusions

FIGURE 11C

Campaign Details

Placemedia
Tuesday, December 15, 2015

Advertiser: Fine Art America
Campaign: Fine Art America Q4 '15 Pixels 30  Status: Running
Start Date: 11/01/15  End Date: 12/31/15  Budget: $35,000  CPM: $5.00

*** Impressions represented are estiamtes and will change.

| Air Date | Air Time | Network | Program | DMA | Market Name | Spot Name | Impressions |
|---|---|---|---|---|---|---|---|
| 11/1/15 | 18:22 | NGC | Not Available | N/A | Not Defined | FAAPIXEL301 | 3,444 |
| 11/1/15 | 18:38 | NGC | Not Available | SJM | St. Joseph | FAAPIXEL301 | 164 |
| 11/1/15 | 19:33 | FX | Not Available | SHR | Shreveport | FAAPIXEL301 | 284 |
| 11/1/15 | 20:11 | BRVO | Not Available | ABI | Abilene-Sweetwater | FAAPIXEL301 | 697 |
| 11/1/15 | 20:11 | BRVO | Not Available | SJM | St. Joseph | FAAPIXEL301 | 693 |
| 11/1/15 | 20:14 | BRVO | Not Available | EUR | Eureka | FAAPIXEL301 | 249 |
| 11/1/15 | 20:37 | DISC | Not Available | EUR | Eureka | FAAPIXEL301 | 575 |
| 11/1/15 | 20:42 | BRVO | Not Available | LIT | Little Rock-Pine Bluff | FAAPIXEL301 | 56 |
| 11/1/15 | 21:06 | BRVO | Not Available | WAC | Waco-Temple-Byran | FAAPIXEL301 | 928 |
| 11/1/15 | 21:07 | BRVO | Not Available | GRW | Greenwood-Greenville | FAAPIXEL301 | 278 |
| 11/1/15 | 21:25 | FX | Not Available | COR | Corpus Christi | FAAPIXEL301 | 202 |
| 11/1/15 | 21:28 | NGC | Not Available | SIM | St. Joseph | FAAPIXEL301 | 244 |
| 11/1/15 | 21:44 | BRVO | Not Available | LIT | Little Rock-Pine Bluff | FAAPIXEL301 | 390 |
| 11/1/15 | 21:44 | BRVO | Not Available | SNT | San Antonio | FAAPIXEL301 | 842 |
| 11/1/15 | 21:50 | FX | Not Available | HOU | Houston | FAAPIXEL301 | 129 |
| 11/1/15 | 21:50 | FX | Not Available | SJM | St. Joseph | FAAPIXEL301 | 763 |
| 11/1/15 | 21:50 | FX | Not Available | SNT | San Antonio | FAAPIXEL301 | 928 |
| 11/1/15 | 21:50 | FX | Not Available | TYL | Tyler-Longview(Lfkn&Ncgd) | FAAPIXEL301 | 272 |
| 11/1/15 | 21:51 | FX | Not Available | LIT | Little Rock-Pine Bluff | FAAPIXEL301 | 289 |
| 11/1/15 | 21:51 | FX | Not Available | SHR | Shreveport | FAAPIXEL301 | 118 |
| 11/1/15 | 22:06 | BRVO | Not Available | LAX | Los Angeles | FAAPIXEL301 | 79 |
| 11/1/15 | 22:13 | BRVO | Not Available | AMA | Amarillo | FAAPIXEL301 | 200 |
| 11/1/15 | 22:14 | BRVO | Not Available | AMA | Amarillo | FAAPIXEL301 | 1,465 |

Tuesday, December 15, 2015  Page 1 of 15

PROGRAMMATIC ADVERTISING PLATFORM

CROSS REFERENCE TO RELATED APPLICATIONS

This application is a continuation of U.S. patent application Ser. No. 14/986,358, filed Dec. 31, 2015, issuing as U.S. Pat. No. 10,546,317, which is incorporated herein by reference in its entirety.

BACKGROUND OF THE INVENTION

Traditionally, advertisers purchase advertisement ("ad") time during upfronts, a time of year when advertisers can purchase airtime to air television ads, referred to as television programming inventory, on television networks and television programming delivered online during a television program broadcasts. Example television ads include commercials that are aired during a program break, transparent overlays that are aired during a program, and text banners that are aired during a program. Companies gather to present their fall lineups and pitch marketers for advertising dollars. Whatever television programming inventory hasn't been sold is then subsequently sold in what is called the scatter market.

While this traditional television programming inventory buying and selling model has worked for decades, it's not without its inefficiencies. Chief among them is the fact that many of the interactions that occur are manual: requests for proposals, insertion orders, ad trafficking, and endless emails and spreadsheets.

In recent years, programmatic advertising has emerged to address these inefficiencies. Programmatic advertising encompasses an array of technologies that automate the buying, placement and optimization of television programming inventory for an ad campaign, in turn replacing human-based methods. In this process, supply-and-demand partners utilize automated systems and business rules to place ads in electronically targeted television programming inventory and generate an ad campaign.

To target television programming inventory, rating estimates of broadcast programs associated with the ad slots are used to generate the ad campaigns. Typically, the ad campaigns are generated well in advance of the airtime, wherein the true value of the airtime placement of the ad is not realized if the ratings estimate is inaccurate, or if the ad that is aired is not relevant in the context of the television program and/or audience. For example, inferior contextual quality of the ad slots may cause the accounting of impressions, the number of homes or individuals exposed to an advertisement or group of advertisements, to be disproportionally high in the day and low at night. The true value of the ad slots would not be realized because of the disproportional accounting of impressions. Additionally, the limited amount of ad slots available for a particular campaign could result in limited reach and/or high frequency of ads delivered to the same viewer which may potentially reduce the effectiveness of the advertising.

Due to these limitations of the programmatic advertising, rates for programmatic advertising are viewed as higher than traditional TV ratings for comparable ad campaigns, without taking into consideration the value of data rich targeting and campaign optimization. Thus, a need exists for a method and system for providing an easy-to-use online platform that allows advertisers to use third party data sets to plan, buy, traffic, track and report on ad campaigns targeted at specific audiences in their local markets.

BRIEF SUMMARY OF THE INVENTION

Various embodiments are generally directed to techniques to predict and design ad campaigns using aggregated audience data to predict impressions on a proprietary platform. Some embodiments are particularly directed to techniques to generate an audience targeted ad campaign and to distribute ads among television programming asset sources based on the ad campaign. Television programming asset sources include, but are not limited to, broadcast TV, national cable, local cable, Video on Demand (VOD), addressable advertising, and advertising for television programming delivered online which includes over the top advertising ("OTT") as well as non-subscription based television programming delivered online by streaming, live, simulcast, through a cloud based delivery and the like. In one embodiment, to generate an ad campaign a programmatic advertisement platform receives a request for an ad campaign, wherein the request comprises selection criteria specified by a user. In response to the request, the programmatic advertisement platform accesses a data storage containing data sets that include a plurality of television programming assets inventoried from a plurality of television programming asset sources, and determines a predicted performance value of the placement of the ad content associated with the ad campaign in the television programming assets. Based on the predicted performance value and the selected criteria, an ad campaign is generated and a report associated with the ad campaign is made accessible to the user. While the invention is described with respect to an embodiment involving television programming, it will be appreciated by those skilled in the art that the system, methods and platforms described herein can also be applied to other environments such as radio programming in its various forms, broadcast, cable, satellite and radio programming delivered online.

Certain illustrative aspects are described herein in connection with the following description and the annexed drawings. These aspects may be indicative of the various ways in which the principles disclosed herein can be practiced. In addition, these aspects and any variations and functional equivalents are intended to be within the scope of the claimed subject matter. Other advantages and novel features will become apparent from the following detailed description when considered in conjunction with the drawings.

FIGS. 6A and 6B illustrate a screenshot of a user interface used to display and add advertiser profiles to the programmatic advertisement platform.

FIGS. 9A-9E illustrate screenshots of a user interface used to generate an ad campaign.

Figure 11A:
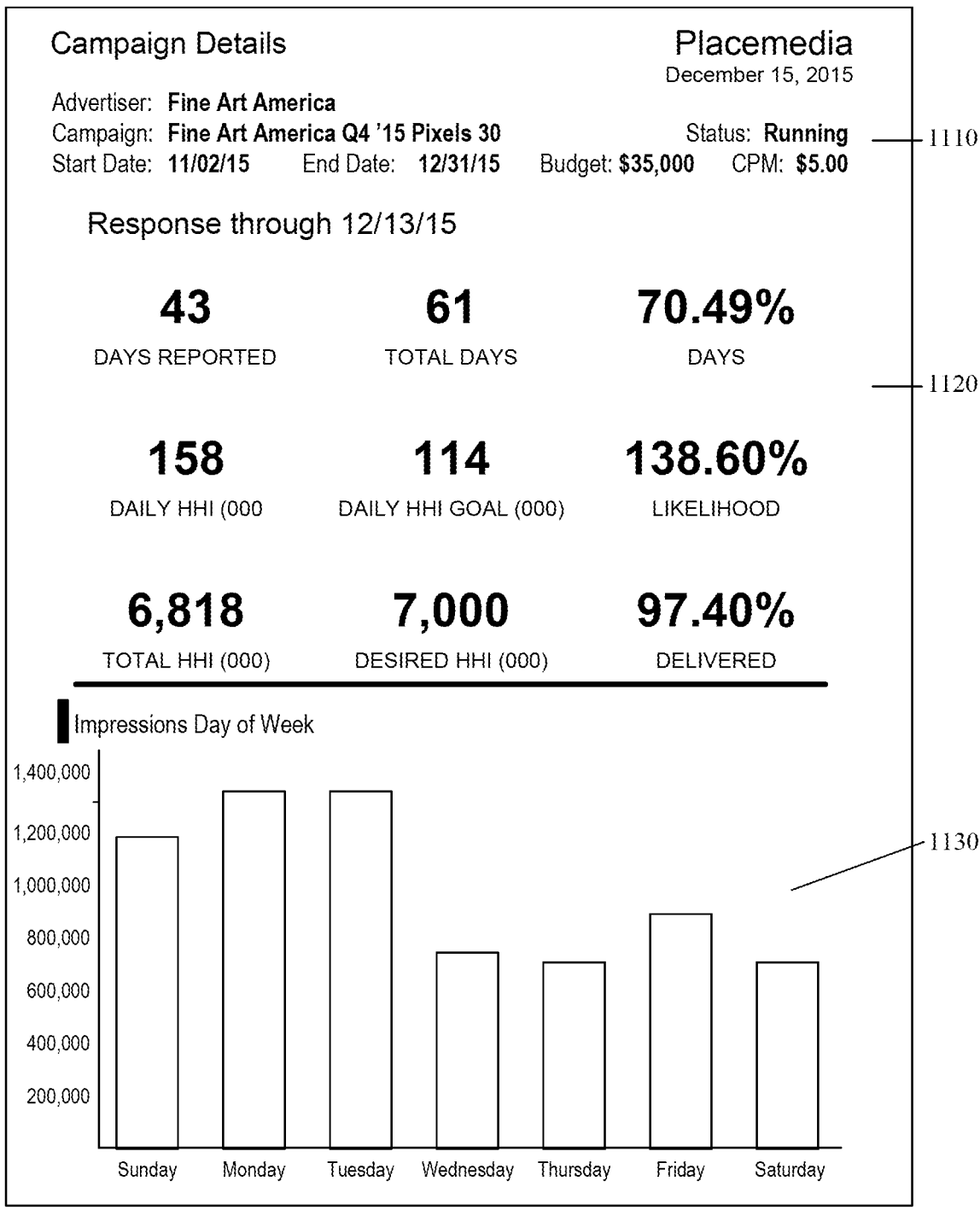
Figure 11B:
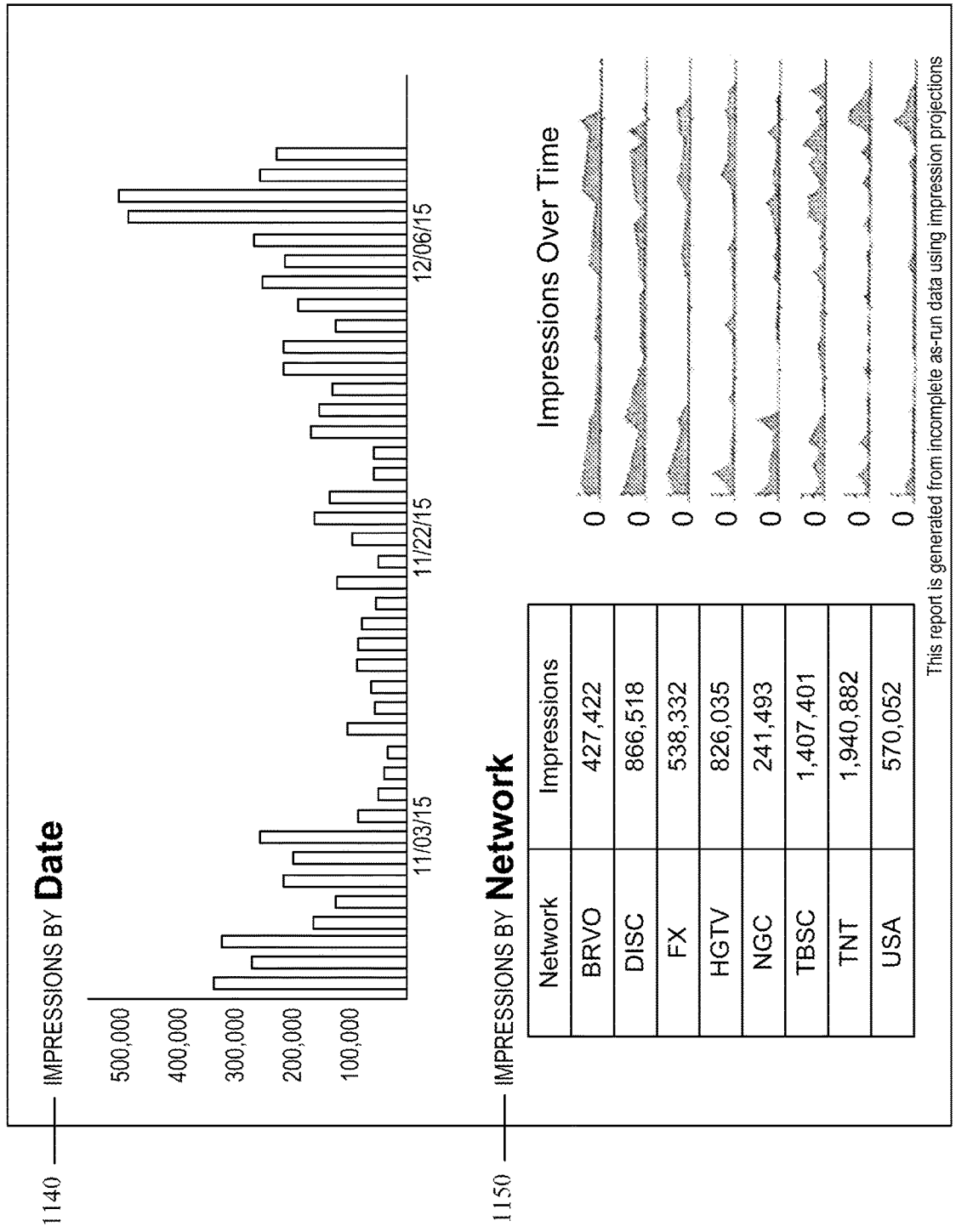

FIGS. 11A-C illustrate screenshots of a generated campaign performance report.

DETAILED DESCRIPTION

Overview

In various non-limiting embodiments, the invention is described in the context of a programmatic advertisement platform for generating an audience targeted ad campaign. Specifically, the programmatic advertisement platform is a platform that facilitates transactions between television programming asset sources, such as TV networks, and advertisers, wherein the transactions lead to distribution of commercials to the various television programming asset head ends based on an ad campaign.

Specifically, the programmatic advertisement platform generates an ad campaign based on the needs of an advertiser, and facilitates the purchase of and placement of the ad content in the media assets, also referred to as ad slots or inventory, based on the ad campaign. To generate the ad campaign, the programmatic advertisement platform correlates media assets from a plurality of media asset sources with audience attributes and ad content. The correlation produces a predicted performance value, which is used as a basis for generating an ad campaign. Therefore, the present invention enables media asset sources and providers of audience attribute information, such as viewership information providers/consumer data providers, to communicate with the programmatic advertisement platform in a way that adds value to, or otherwise facilitates the valuation of, the media asset sources in context of the particular ad. The programmatic advertisement platform delivers improved performance and lower effective cost of television ad campaigns by using automation for simplification and advanced targeting algorithms to reach desired audiences more efficiently.

A simplified overview has been provided in the present section to help enable a basic or general understanding of various aspects of exemplary, non-limiting embodiments that follow in the more detailed description and the accompanying drawings. This overview section is not intended, however, to be considered extensive or exhaustive. Instead, the overview presents some concepts related to some exemplary non-limiting embodiments of the invention in a simplified form as a prelude to the more detailed description of these and various other embodiments of the invention that follow.

Exemplary Operating Environment(s)

Figure 1:
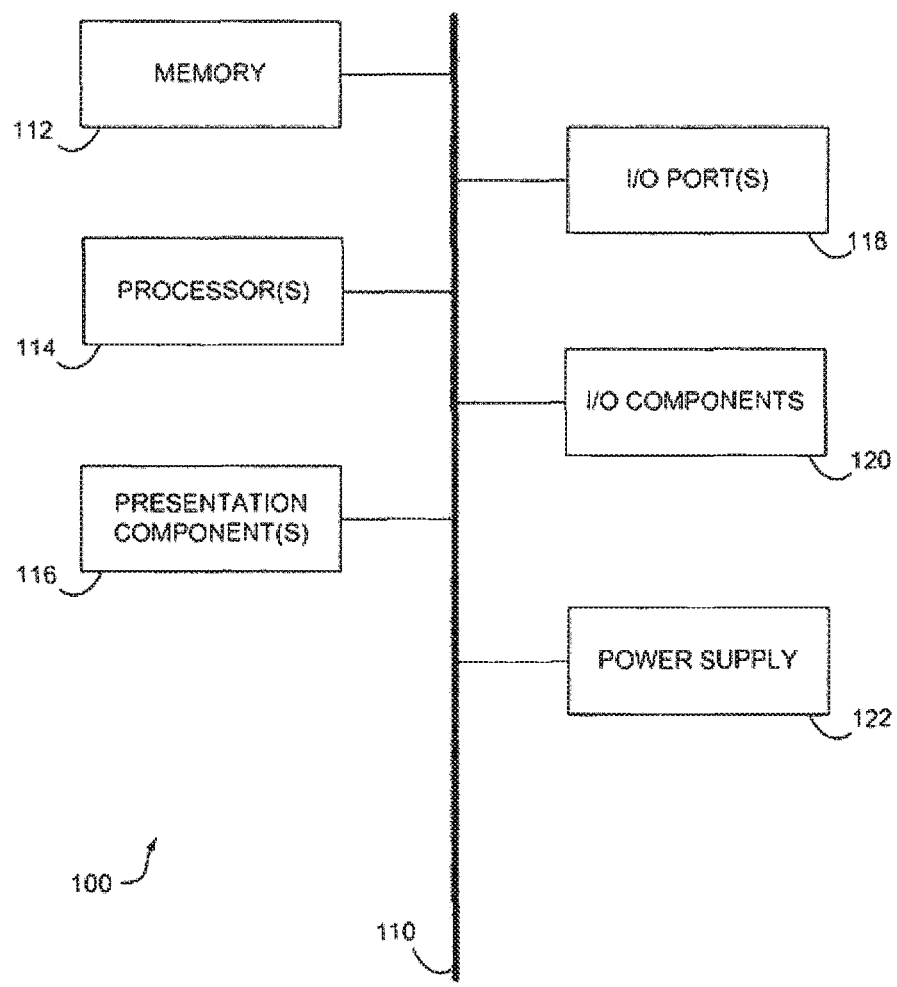
FIG. 1 is a block diagram of a computing system environment suitable for use in implementing the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated. In accordance with the invention, participants can communicate with a programmatic advertisement platform via one or more computing devices 100, and the programmatic advertisement platform may also comprise one or more computing devices 100, in order to carry out one or more aspects of the invention described in detail below.

In this regard, the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network. These devices or systems are referred to as "computing devices."

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory, or otherwise communicate with memory, it should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EE-PROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device, Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Programmatic Advertisement Platform System Architecture Overview

Figure 2A:
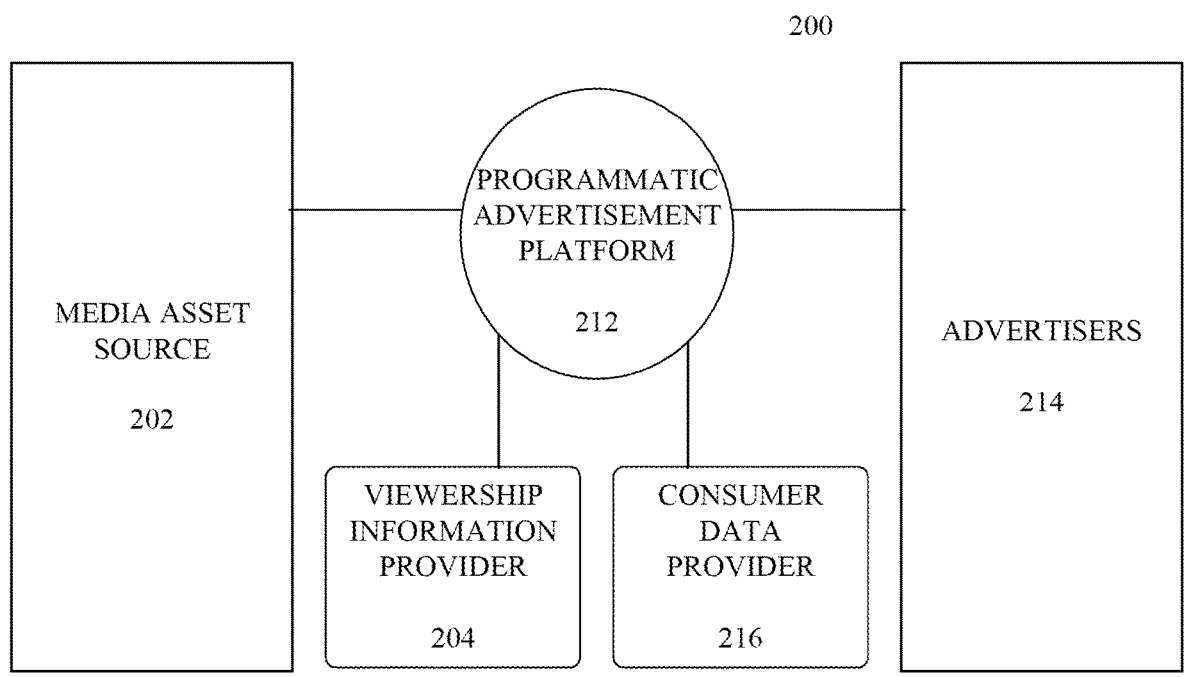
FIG. 2A illustrates pan exemplary architecture for a programmatic advertisement platform system according to embodiments of the present invention.

Exemplary environment or architectures of a programmatic advertisement platform in which one or more of the various embodiments of the ad campaign generation techniques in accordance with the present invention may be deployed or implemented are now described. For instance, FIG. 2A illustrates an exemplary architecture 200 for a programmatic advertisement platform system, which comprises a programmatic advertisement platform 212 associated with media asset sources 202. The programmatic advertisement platform 212 provides a way for facilitating commercial transaction between a plurality of media asset sources 202 and a plurality of advertisers 214, wherein the commercial transaction will ultimately lead to a distribution of copies of commercials to various media asset head ends, such as, for example, TV networks, based on media plans derived by the programmatic advertisement platform 212.

For purposes of explanation only, the media asset sources 202 will be discussed herein as a group of any number of media asset sources. However, embodiments of the present invention are not limited to a group of media asset sources, as a single media asset is sufficient. Also, embodiments of the present invention are not limited to a single group of media asset sources, as any number of groups of media asset sources may be present in architecture 200.

Each media asset source provides 202 an inventory of available ad slots to a programmatic advertisement platform 212. For example, a TV network, such as NBC or CBS, provides available ad slots that will be inserted into a broadcast show. Media asset sources 202 are intended to represent any number of types and sizes of networks, broadcasters, cable companies or satellite providers. For example, the media asset sources may include broadcast television, national cable television, local cable television, VOD, addressable advertising, internet protocol television, over the top video services, TV everywhere video services, or other TV services that include television programming delivered online.

Architecture 200 also comprises advertisers 214 associated with the programmatic advertisement platform 212. An advertiser 214 may be any organization, group, individual or associate thereof that is buying television airtime to disseminate an ad. For purposes of explanation only, only one advertiser will be discussed herein. However, embodiments of the present invention are not limited to a single advertiser, as any number of advertisers a reserved by the present invention. Advertisers 214 request generation of ad campaigns from the programmatic advertisement platform 212 based on selected criteria. As discussed in more detail below, to generate an ad campaign, the programmatic advertisement platform aggregates the media assets from the media asset sources, determines a predicted performance value of the ad campaign based viewership information and consumer data, and generates a targeted ad campaign based on the predicted performance value for advertisers 214.

To determine a predicted performance value of an ad campaign, the programmatic advertisement platform 212 collects viewership information and consumer data information. The programmatic advertisement platform 212 collects viewership information and consumer data information from viewership information providers 204 and consumer data providers 216, respectively. For purposes of explanation only, only one viewership information provider and consumer data provider will be discussed herein. However, embodiments of the present invention are not limited to a single viewership information provider or a single consumer data provider, as any number of viewership information providers and consumer data providers may exist.

In an embodiment, the viewership information provider 204 is an aggregator of data from various sources associated with collecting viewership information. For example, a viewership information provider, such as Rentrak, Acxiom or Nielsen, tracks viewing behavior from a plurality of televisions or set top boxes across a plurality of markets. The viewership information provider 204 is communicatively coupled to the programmatic advertisement platform 200.

In an embodiment, the consumer data provider 216 is an aggregator of data from various sources associated with collecting consumer data. In one embodiment, the consumer data provider aggregates data and uses the data for modeling, wherein sample data sets are used as indicative of the general national marketplace television viewing behavior. For example, Nielsen's Diaries, a consumer data provider service, provides data in the form of surveys and people meter programs, where a small number of TV households are deemed as statistically relevant for national television viewing ratings. In another embodiment, the consumer data provider 216, such as Acxiom, may also analyze and parse consumer and business information collected from a plurality of head ends of viewer devices. For a non-limiting example, consumer data may include attributes such as gender, age, location and income.

The viewership information and consumer data may come from many different providers that format the data in many different ways. In this regard, any representation of value as understood may be translated into a representation within the programmatic advertisement platform 212 in accordance with the invention, and thus, various embodiments of the invention contemplate the enrichment of the programmatic advertisement platform 212 with information as normalized and utilized within the platform in accordance with the invention. In one embodiment, the programmatic advertisement platform 212 normalizes data by checking the viewership and consumer data against industry data to ensure accuracy. The industry data may be obtained from viewership information providers such as Kantar, Rentrak or Nielsen.

The programmatic advertisement platform 212 may utilize the viewership information and the consumer data to derive statistical information. In one embodiment, the programmatic advertisement platform matches the consumer data to set top box viewing data derived from the viewership information in a double blind method to determine actual viewing behavior tied to the consumer data segments. Using this matched data, statistical information may be derived. The statistical information can be analyzed to determine a targeted audience for an ad campaign by providing insight as to future performance of the ads, referred to as a predicted performance value. Once the targeted audience has been determined, a targeted ad campaign can be generated for the advertiser by the programmatic advertisement platform 212.

For example, a predicted performance value may indicate that advertising locally may be more effective than advertising nationally for a local San Francisco business owner who operates a restaurant and wants to increase business. The local business owner would benefit from the programmatic advertisement platform taking into consideration the location of consumers that will be viewing the ad while determining an ad campaign. That way, the ad campaign that is developed for the local business person will include ad slots that are broadcasted in the local area, such as on Time Warner in San Francisco. In another example, a predicted performance value may indicate that a massive corporate entity such as Starbucks, which has thousands of products and services, would benefit less from a local ad campaign than a national ad campaign. In this scenario, the location information for consumers that will be viewing the ad may not be an important factor in determining an ad campaign. Advertisers 206 are intended to represent any number of types, sizes, sophistication levels, etc. No matter the size of the advertiser 206, advertisers desire to utilize resources efficiently to place ads on media asset sources 202 broadcasts, and particularly, where value added by the platform based on viewership information and consumer data indicates that the advertising transaction is likely to provide a good return on investment.

In one embodiment, advertisers may not place as much importance on the viewership information or the consumer data. Instead, advertisers may solely or principally be interested in the number of homes or individuals exposed to an advertisement or group of advertisements, as defined as number of impressions. An example of where advertisers may only be interested in the number of impressions is in the video on demand (VOD) inventory space.

VOD has also become a popular platform not only for consumers but also among television networks, advertisers and cable service providers for its ability to be measured and therefore monetized. It has created the atmosphere for new advertising opportunities in the non-traditional television world. An example is Dynamic Ad Insertion (DAI). DAI expands advanced advertising opportunities by allowing cable providers to target ads that can be swapped in and out of VOD content. Ads can be inserted into VOD content through pre-roll, mid-roll and post-roll formats.

Dynamic Ad Insertion has created opportunities for all parties involved to gain more value out of this form of advertising. One of the major advantages for VOD advertising is that most ads are non-skippable by the viewer; however, that function is determined by individual network programming providers. The continued incorporation of DAI should allow advertisers more opportunities to re-capture lost 'live' TV viewing and increase the reach of key demographics as time-shifted viewing through VOD continues to grow.

Once an ad campaign has been generated by the programmatic advertisement platform 212 and the advertisers 214 have approved the generated ad campaign, an order can be placed for the inventory supplied by the media asset source 202. On each order for inventory, the media asset source 202 will set a price, i.e., reserve price, for their available ad slots, and programmatic advertisement platform 212 will place an order on behalf of the advertiser 214 on the right to have their ads displayed during the ad slot. This embodiment is not limited to consumer price index (CPI) pricing, but CPI pricing is an example of a common pricing model that can be used. For example, all ad slots have a fixed price set by the media asset source 202. Rates may be determined by weighted combination of rate cards provided by the media asset source 202, the campaign budget, flight length and dates, network and/or daypart requirements, seasonality requirements and guaranteed audience targeting. In one embodiment, programmatic advertisement platform 212 takes a fractional portion of the revenue flowing through it to support its operations, which can either be implemented via incrementing the media asset sources 202 ask by some percentage, or by making agreements with media asset sources 202 that some percentage of the revenue generated from their traffic will be held back.

Because media asset sources 202 are concerned with user satisfaction, in some cases, the media asset sources 202 would prefer to have some control over the relevancy of the ad airing on their network. Viewership information is considered a good measure of relevance and therefore many advertisers 214 and media asset sources 202 might want impression view guarantees on the ad performance. Programmatic advertisement platform 212 allows the advertisers 214 and the media asset sources 202 to optionally specify a minimum impression view guarantee that is acceptable. Programmatic advertisement platform 212 monitors the viewership information provider 206 in order to track the minimum impression view for each ad campaign. In one embodiment, the ad campaigns are evaluated weekly for delivery against the impression and audience goals. When the minimum impression view and/or audience goals are met, the ad campaign is meeting its performance guarantees. In an embodiment, if an ad campaign continuously fails to meet the minimum impression view guarantee and/or the audience goal, the programmatic advertisement platform 212 may provide recommendations for modifications to the ad campaign. For example, the programmatic advertisement platform 212 may find impressions in other inventory that meet the advertiser's requirements and new order may be placed with the media asset provider.

In one embodiment, using architecture 200, the performance of an already existing ad campaign can be tracked. In one embodiment, the ad campaigns may be tracked by collecting data about the number of impressions tuned to the advertisement. The impressions are collected on a periodic basis, such as hourly, daily, weekly, monthly, act. The impressions may also be collected by the network. The data from tracking the existing ad campaign can then be used to determine modify the existing ad campaign.

Figure 2B:
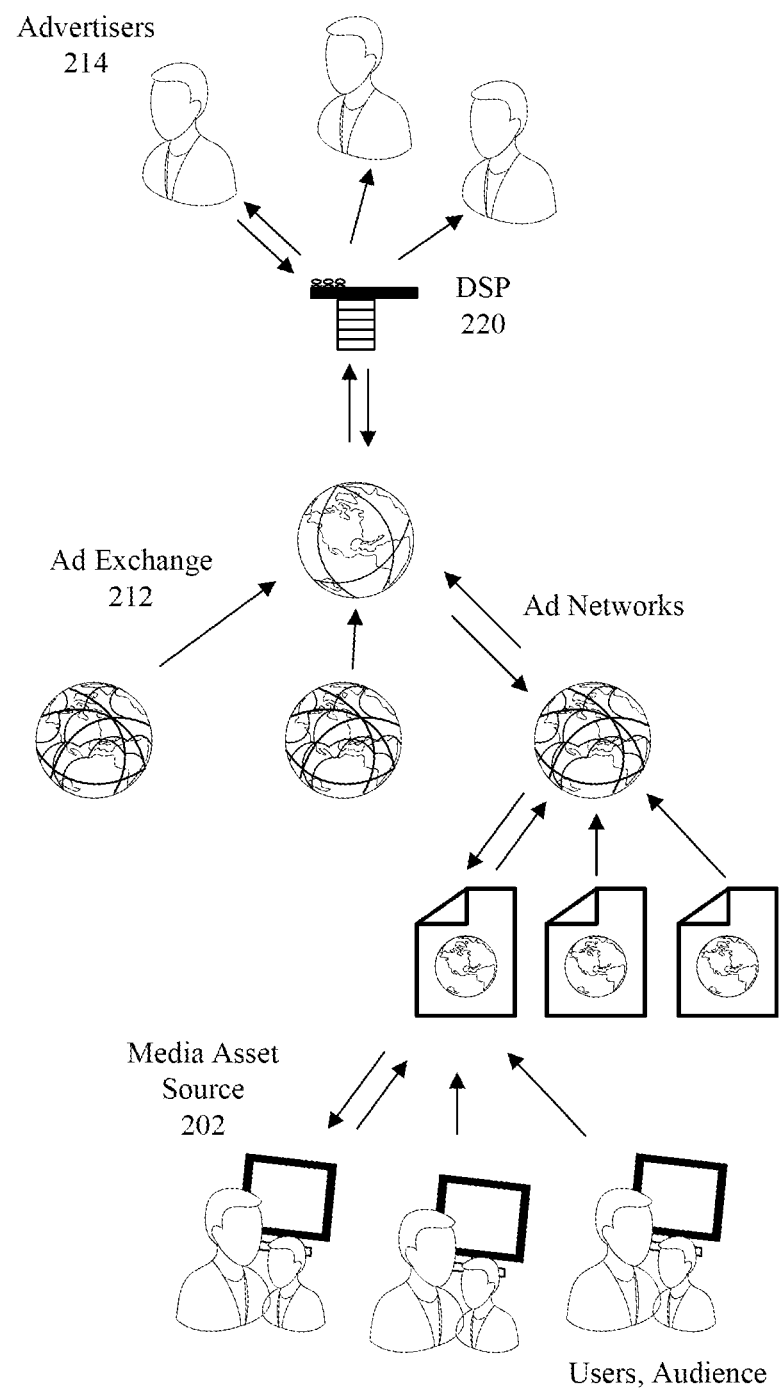
FIG. 2B illustrates one example of a programmatic advertisement platform system according to embodiments of the present invention.

FIG. 2B illustrates one example of a programmatic advertisement platform system 200B, which comprises a programmatic advertisement platform 212 associated with demand side platform (DSP) 220. The DSP 220 integrates multiple pools of impression opportunities from multiple exchanges for bidding by advertisers. The DSP 220 may provide an advertiser access to a plurality of impression opportunities provided via the programmatic advertisement platform 212. The DSP 220 and the programmatic advertisement platform 212 functions as an interface between the plurality of media asset sources 202 and the advertisers 214. The DSP 220 may process information associated with the various media asset opportunities and normalize these into appropriate parameters for comparison against goals and constraints set by advertisers. In some embodiments, the DSP 220 may statistically and/or intelligently process past and present information to help the advertiser customize and constraints set by the advertisers 214. Based on the goals of the advertisers 214, the DSP 220 may determine a rule set or constraints for media asset purchases for the advertisers 214.

The communication interface may be used for communicating media asset requests from the DSP 220 to the programmatic advertisement platform 212. The communication interface includes an application programming interface (API). The API is configured to be executed by the DSP 220. The API is also configured to receive media asset requests from an application program being executed by the DSP 220 and format the received media asset requests into commands of a dedicated media asset request command set. The API is further configured to drive a first host channel adapter. The first host channel adapter is coupled via a switched fabric link to a second host channel adapter of the programmatic advertisement platform. The API drives the first host channel adapter so as to direct the formatted media asset request commands, via the first and second host channel adapters and the switched fabric link, to a programmatic advertisement platform application program being executed on the programmatic advertisement platform 212. The API lets DSP 220 and advertisers 214 seamlessly connect their platforms with the programmatic advertisement platform 212. The programmatic advertisement platform 212 will accept campaign requests for targeted audiences or plans based on the dedicated media asset request command set information, such as network and daypart. The API creates a simple and flexible way to access billions of monthly media assets from national and local linear TV.

Figure 3:
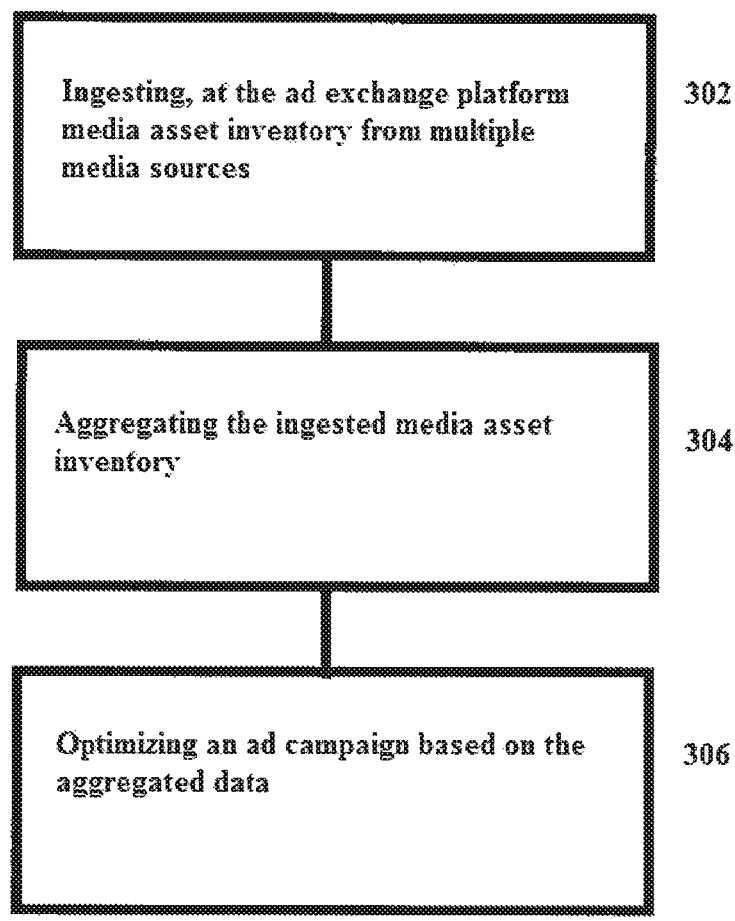
FIG. 3 illustrates one example of the flow of data within the architecture of the programmatic advertisement platform according to embodiments of the present invention.

FIG. 3 illustrates one example of the flow of data within architecture 200, according to embodiments of the present invention. Referring to FIG. 3, in step 302, the programmatic advertisement platform 212 ingests media asset inventory from multiple media asset sources. In one embodiment involving television programming, the media asset provides media asset inventory selling rules, such as rates, type, availability and restrictions along with the media asset inventory. In step 304, the ingested inventory is aggregated. In one embodiment, the ingested inventory is blindly aggregated such that the media asset sources relinquish control over what advertisers will run during the ad slots. Aggregating the inventory blindly provides low pricing through large bulk buys of the media asset inventory combined with optimization and ad targeting technology.

Once the inventory is ingested by the programmatic advertisement platform 212, in step 306, each media asset is optimized by matching or correlating the media asset to viewing information retrieved from the viewing information provider 204 and ad content associated with the ad campaign. Each media asset is then again matched or correlated with consumer data retrieved from the consumer data provider 216 and the ad content associated with the ad campaign. The matching or correlation of the inventory with the viewing information, the consumer data and the ad content provides an added value to media assets in the inventory, wherein the added value may be a highly indexed audience target associated with the ad content.

In one embodiment, the programmatic advertisement platform 212 ingests regular file updates from the media asset sources 202. The regular file update includes availability of the media asset inventory and rates by the media asset sources. Once the media asset inventory is updated on the platform 212, each media asset is optimized again by matching or correlating the media asset sources with the viewing information, the consumer data and the ad content. The media asset inventory may be optimized periodically, such as daily, weekly or bi-weekly, seasonally or manually.

In a specific example, the matching or correlating of the media asset sources with the viewing information, the consumer data and the ad content is accomplished by searching available inventory for inventory with the highest rating for the requested demographic segment while also factoring in all other requirement and constraints in a given campaign. To determine inventory with the highest rating for the requested demographic segment, the programmatic advertisement platform determines a demographic impression by multiplying the demographic rating of the network at the quarter hour time of the aired spot by the universal estimate (UE) of the zone in which the spot was viewed. The result is then multiplied by the ratio of the target demographic UE to the national TV viewing household UE.

$$\text{Demographic Impression} = \text{UE (zone)} \times \tfrac{1}{4} \text{ hour } R \text{ (demo)} \times \text{UE (demo)}/\text{UE (TV HH)}$$

UE (zone)=universal estimate of the zone in which the spot was viewed
R (demo)=demographic rating of the network
UE (demo)=target demographic of the universal estimate
UE (TV HH)=TV viewing household universal estimate calculated by multiplying the quarter hour household rating of the network at the time of the aired spot by the universal estimate of the cable zone in which the spot was viewed.

The above example illustrates just one embodiment of the present invention. Other embodiments may not involve the same operations or conduct them in the same order. Specifically, the contexts in which optimization of the media asset inventory can provide value to the platform 212 in accordance with the invention are practically limitless, i.e., anytime an advertiser or media asset participating in a valuation of ad slots or broadcasts may benefit from external action or information, the platform 212 has an opportunity to make that benefit happen by providing the corresponding value.

Functionality of a Programmatic Advertisement Platform

Figure 4:
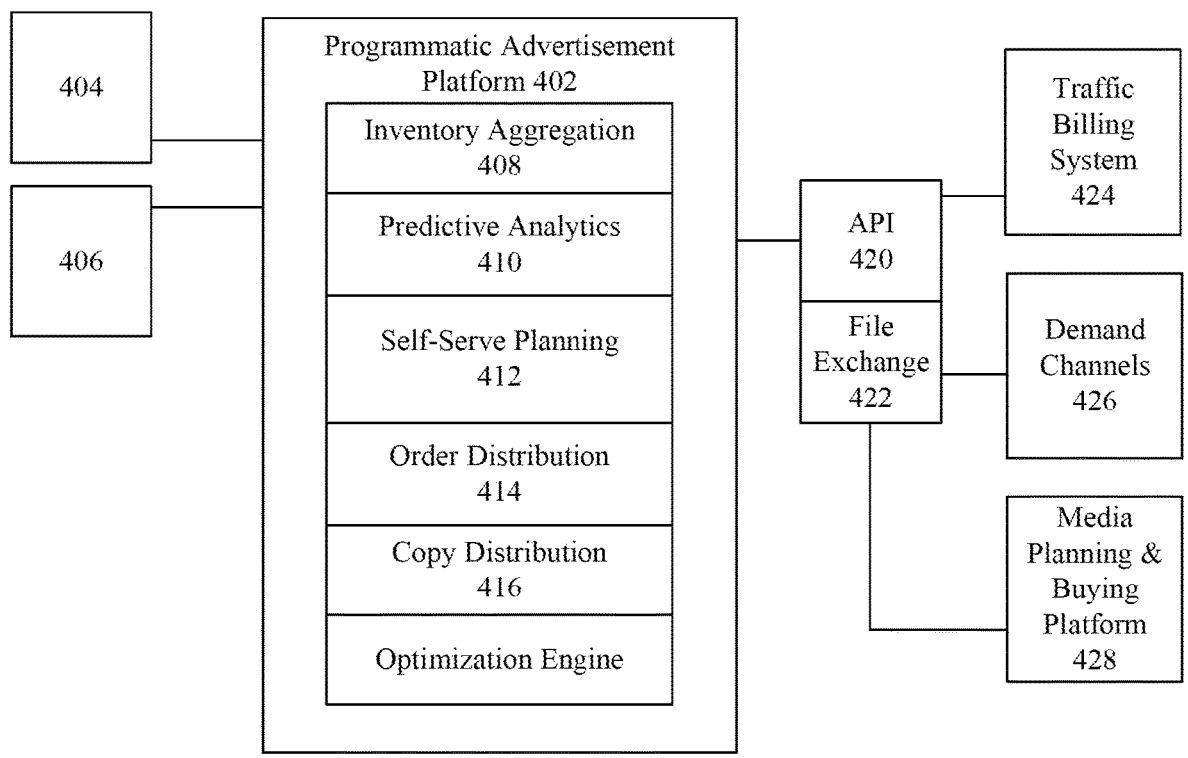
FIG. 4 illustrates an exemplary functional architecture for a programmatic advertisement platform according to embodiments of the present invention.

FIG. 4 illustrates an example of functional architecture 400 for a programmatic advertisement platform. The functional architecture 400 illustrates the programmatic advertisement platform web server 402. The web server 402 may be generally arranged to host and execute one or more additional programmatic advertisement platform components. The components are not advertiser or broad internal user facing portals; instead, the components are executing processes in the background of the programmatic advertisement platform web server 402 in support of an advertiser's actions made in an external user facing interface 420 associated with the web server 402. The components include an inventory aggregation engine 408, a predictive analytic engine 410, a self-serve planning engine 412, an order distribution engine 414, a copy distribution engine 416, and an optimization engine 418. The components, described in greater details below, use the media asset inventory stored in the inventory file database 404 along with the viewership information and consumer data stored in the data sets database 406 to generate ad campaigns based on an optimize media asset inventory. Once the ad campaigns are created, post ad campaign reports are transmitted to the advertisers.

The programmatic advertisement platform web server 402 implements interfaces 420 and 422. The interfaces 420 and 422, in certain embodiments, are used to manage and build ad campaigns, and create and deliver post ad campaign reports to advertisers. The interfaces 420 and 422 may allow the programmatic advertisement platform to access the media asset sources, viewership information providers, and consumer data providers to obtain the data associated with the available media assets. The inventory aggregation component 408 aggregates the data. The predictive analytics component 410 determines a predicted performance value for the ad content associated with the ad campaign. The interfaces 420 and 422 also provide the advertisers access to the self-serve planning component 412 and the order distribution component 414.

The self-server planning component 412 allows advertisers to create or edit ad campaigns on the web server 402. For example, an advertiser, by the self-server planning component, may generate an optimized television programming plan based on all of the entries inputted or selected by the advertiser. The self-server planning component may display a graphical user interface that allows an advertiser to specify criteria for an ad campaign. In some instances, criteria, such as ad policy, campaign period, campaign budget and the like, may be used to generate the ad campaign. An ad policy may proscribe the placement of the ad content in an ad slot for a specific period of time. For instance, the ad policy may restrict placement of ad contents in an ad slot for the months of January and February only or seasonally only. In some embodiments, the policy may restrict the ad contents to be placed in ad slots associated with particular cable networks. In further embodiments, the policy may prevent displaying the ad contents in ad slots associated with certain types of broadcasts, such as cartoons. An ad policy may also define impression guarantees for an ad campaign. For example, a policy may allow an ad campaign to establish a number of expected impressions.

The self-serve planning component 412, in some embodiments, also provides suggestions for updating or developing the ad campaign. In one embodiment, the self-serve planning component 412 may provide audience recommendations based on the subject matter of the campaign or the impressions for the ad slots for the ad campaign based on an analysis of the criteria and ad content submitted by the advertiser. For example, an ad campaign for a sports themed restaurant may obtain a recommendation from the self-serve planning component 412 to include soccer audience segments, NFL football audience segments, NCAA football audience segments, tailgating audience segments, or food audience segments. These recommendations may be based on the criteria submitted by the advertiser, the ad content, viewership information, consumer data and the predicted performance value of the ad content associated with the ad campaign.

In some embodiments, different user groups of the same advertising organization may use the interfaces 420 and 422 to develop or edit ad campaigns on behalf of the advertising organization. For example, different user groups include ad agencies, direct advertisers, advertising sales representation organizations, DSP operators, supply-side platform operators, advertising suppliers, and technology partners. Individuals at all organizational levels may access the platform, and based on their roles and/or levels, the individuals will have access to different functionalities in regards to creating, developing, updating and accessing an ad campaign.

As discussed above, the interfaces 420 and 422 of the web server may provide the advertiser several ad campaign building options. In one embodiment, the interfaces 420 and 422 allow the advertiser to specify broad campaign objectives. For instance, the advertiser may specify the length of the campaign and the desired audience segment. In turn, the self-serve planning component suggests a campaign, a number of impressions across several categories, and a budget for the ad campaign. Once the ad campaign is generated and delivered to the advertiser, the advertiser may modify the campaign by removing impression categories, adding impression categories, or adding other criteria via a modification option of the interface.

The modification option, in one embodiment, allows the advertiser to enter or select from the plurality of ad campaign criteria. In one embodiment, the advertiser enters or selects an option to modify the ad campaign. Thereafter, the advertiser may be able to change the criteria options that were originally selected. The advertiser may change the campaign budget, the duration of the campaign, the network preference, the audience preference, the ad subject matter preference, the daypart preference and/or the seasonality preference. For example, a florist looking to advertise on local cable may set criteria for her ad campaign to include a network preference of HGTV with a target audience of adults between an age range of 20-40 years old.

Once the ad campaign has been created or modified, the order distribution component 414 can convert the campaign into spot based cable TV orders and distribute the orders to individual media asset providers in a desired format to be ingested into the appropriate media asset provider's system. The order distribution component 414 distributes the orders via the interfaces 420 and 422. Based on the received orders, the media asset providers will determine the traffic and billing for each advertiser. In one embodiment the ad slots that are ordered once the campaign is accepted by the client. However, clearance of the ad slots is not known until after the air date and as run files are received by the programmatic advertisement platform from the media asset suppliers.

A copy of the advertisement in electronic form is delivered to the copy distribution module 416 associated with the programmatic advertisement platform. The copy may be delivered to the copy distribution module by using an FTP server, wherein the advertiser uploads a creative file. The electronic copy may also be delivered using a third party copy distribution service, such as Extreme Reach or Yangaroo, wherein the advertiser delivers the copy to the third party copy distribution service and the programmatic advertisement platform retrieves the copy from the service. In one embodiment, a plurality of different advertisement copies may be distributed by the advertiser. In such a case, a copy rotation instruction may also be provided by the self serve planning module along with the copy.

Once the programmatic advertisement platform 402 receives the copy and the copy rotation instructions, the programmatic advertisement platform 402 distributes the copy and instructions to the individual media supplier in a format and using a delivery mechanism requested by the media supplier. In one embodiment, this may be done at the same time as the order is distributed or subsequently but prior to the campaign start date.

Once the orders have been distributed, the ad campaign may commence. Once the ad campaign commences, the optimization engine component 418 may collect delivery data throughout the ad campaign and optimize the orders to ensure the highest possible delivery based on the ad campaign objectives specified by the advertiser.

A web based report repository communicatively associated with the web server 402 may be accessed by internal and external users to generate and download post campaign delivery reports. In certain instances, the report contains campaign specific data based on as-run files that are ingested daily from the media asset providers by the web server 402.

Figure 5:
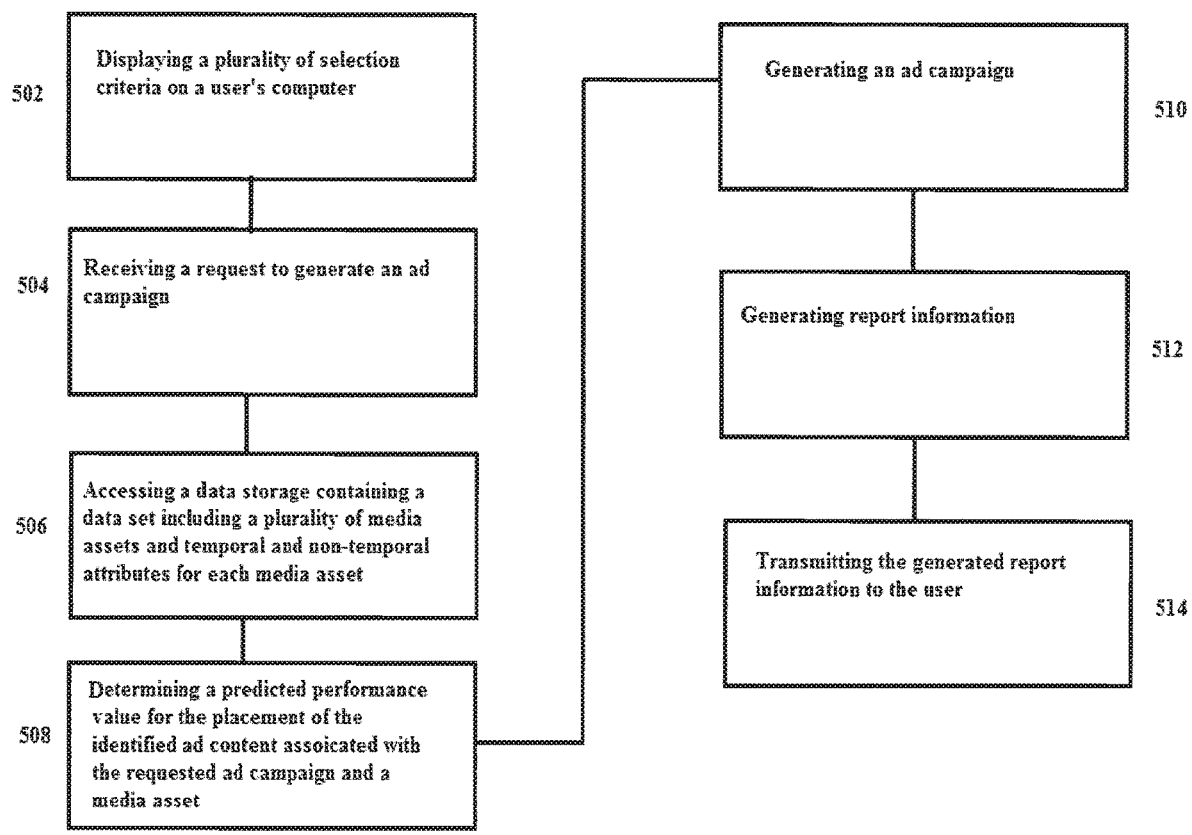
FIG. 5 illustrates a flowchart of the functional operation of a platform, according to embodiments of the present invention.

FIG. 5 provides a flowchart of the functional operation of a programmatic advertisement platform, according to embodiments of the present invention. Referring to FIG. 5, method 500 begins, at step 502, when a plurality of fields for entry of selection criteria for an ad campaign is displayed on an advertiser's computing device. In one embodiment, the selection criteria are displayed on a graphical user interface. The selection criteria include campaign dates, a target audience, a campaign budget and an ad content identification. In one embodiment, the selection criteria additionally include at least one of a hiatus week, a spot length, a primary target audience, a secondary target audience, a weight of importance measurement for each day, and a network preference. The network preference may include network exclusions, specified networks, a weight of importance measurement for each network, and a percentage of networks to include in each daypart. In another embodiment, the selection criteria omit cost per thousand impressions ("CPM"), daypart by networks and days of the week by network.

Once an advertiser selects criteria of the ad campaign, at step 504, the programmatic advertising platform receives a request to generate the ad campaign from the client computing device. The request includes the selection criteria specified at the graphical user interface on the client computing device.

At step 506, the programmatic advertising platform accesses a data storage containing a data set. The data set includes a plurality of media assets, such as television programming assets, inventoried from at least one of a plurality of media asset sources and temporal/non-temporal attributes for each of the media assets. In one embodiment, the data set may also include viewership information and customer data used to optimize and add value to the media assets.

At step 508, a predicted performance value is determined using the data set. The predicted performance value is used to place the identified ad content associated with the requested ad campaign into at least one segment of one of the plurality of media assets. In one embodiment, the predicted performance value includes determining the relationship of a success metric for placement of the ad content in a segment of the media asset and a number of the targeted impressions for the segment.

At step 510, an ad campaign is created by selecting media assets from the accessed data set to populate the requested ad campaign based on the determined predicted performance value and the selection criteria. In one embodiment, the ad campaign is transmitted to the advertiser, where the advertiser may accept the generated ad campaign or may modify the ad campaign. If the advertiser accepts the generated ad campaign, an order for the selected media assets may be generated and transmitted to the owners of the selected media assets to secure placement for the identified ad content in the selected media assets.

In one embodiment, if the advertiser elects to modify the ad campaign, the advertiser may select different criteria and request generation of a new ad campaign.

At step 512, report information associated with the created ad campaign is generated and includes dates, the campaign budget, time ranges, a summary of the media assets and created ad campaign, the summary containing dates, the campaign budget, time ranges, a summary of the media assets and predicted performance values. In one embodiment, the report information includes at least one analytical factor such as a plan impression score, an impression heatmap, an impression distribution, and an impression delivery schedule.

At step 514, generated report information is transmitted to the advertiser. In one embodiment, once the ad campaign commences, performance data is stored at the programmatic advertisement platform from each of the media assets. The performance data may be based on as-run files ingested periodically from the media assets. The report information, including the performance data, may be transmitted or made accessible to the advertiser.

FIGS. 6-7 are screenshots of a user interface used to generate and manage ad campaigns using the programmatic advertisement platform. In one embodiment, user is an employee or agent of an ad agency. Each ad agency is a subscriber to the programmatic advertisement platform and has an account associated with organization running the programmatic advertisement platform. Each subscriber is registered with the programmatic advertisement platform to create these accounts. For a user to access that user's profile on its employer's account, the user utilizes a computing device to open a standard internet browser such as Microsoft Internet Explorer, Mozilla Firefox, or any other type of internet access software, which connects the subscriber's computing device to the internet. Upon entering certain URL information corresponding to an Internet location on the programmatic advertisement platform server or other data storage location, the internet browser displays a login screen to gain access to the programmatic advertisement platform. The interface associated with the programmatic advertisement platform in the illustrated embodiment is run through the internet browser but, alternatively, the programmatic advertisement platform can run as separate executable software installed onto the computing device.

The login screen will vary depending on the individual service provider or the computing device running the programmatic advertisement platform. For example, a login screen in a window from a generic internet browser may include an address bar, a search bar, a forward button, a back button, a stop button, and a home button. The login screen itself features a User Name entry box and a Password entry box, where the user enters the specific subscriber login information corresponding to that subscriber or user. A subscriber can have general login information, or additionally have individual login information for each of its users.

In the programmatic advertisement platform, user registration records associated with the subscriber login information can be role-based. In such a configuration, each user is allowed to interact with the programmatic advertisement platform according to the set of roles associated with the user's login information. Business rules controlling permissions for each role are set by an administrator and are then stored. Examples of user roles include account executive manager, account executive, agency manager, advertiser manager, advertiser, brand manager and brand.

The user registration records associated with the subscriber login information also supports the notion of advertisement accounts. By assigning an account to all orders of users, each user will be provided, by the programmatic advertisement platform, a personalized platform in which to create and manage accounts. For example, an ad agency employing the user may manage accounts for Advertisers 1, Advertiser 2 and Advertiser 3. The user may only be in charge of generating campaigns for Advertiser 1 and Advertiser 2. The programmatic advertisement platform, by the application of role-based and user-based business rules will only provide the user access to information associated with Advertiser 1 and Advertiser 2.

In one embodiment, once the user successfully completes the login, the user will be directed to another web page where a user interface is displayed to the user. The user interface may have multiple tabs to provide handles to ad information associated with the advertisers managed by an agency. For example, the user interface may have a home tab, campaign tab, copy tab, client tab and site tab, as depicted in FIGS. 6A and 7A.

Figures 7A, 7B:
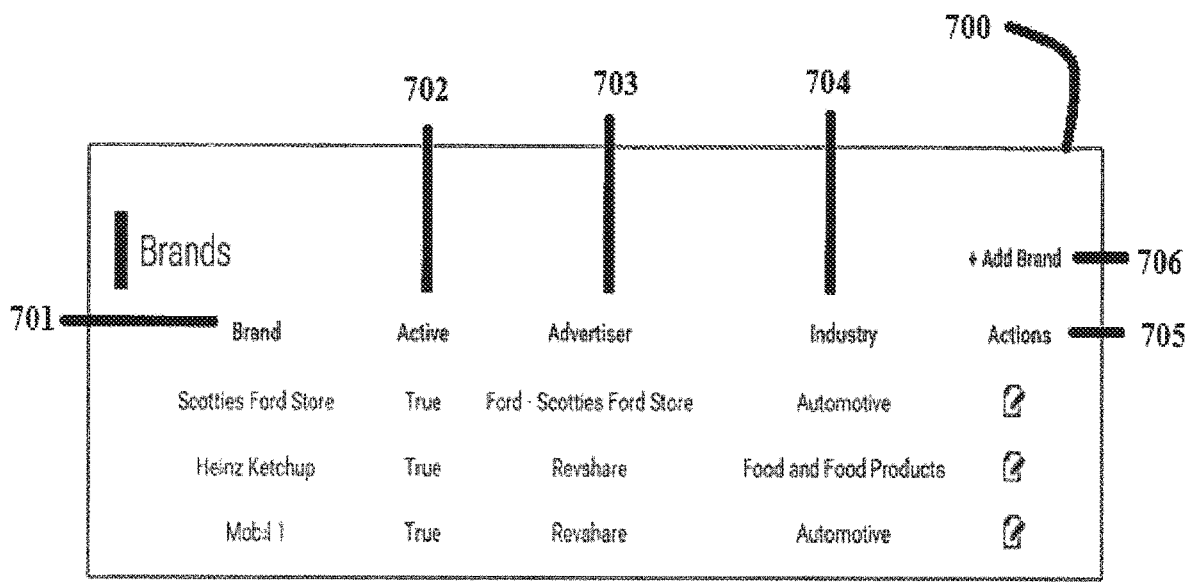
FIGS. 7A and 7B illustrate screenshots of a user interface used to display and add brand profiles to the programmatic advertisement platform.

When a user selects the clients tab, the user will be presented with a list of client advertisers and/or a list of brands associated with their agency, as depicted in FIGS. 6A and 7A.

FIG. 6A is a screenshot of the user interface 600 presented to the user listing advertisers associated with their agency. The advertiser list includes a list of client advertisers 601 associated with the user's agency. The list may also include contact information 602, address, phone number, fax number, e-mail address, or any other piece of information associated with each advertiser in the list. The advertiser list user interface may also include an action button 604 for each advertiser. By selecting or clicking on the action button 604, the user can modify the information associated with the advertiser and/or information associated with the ad campaign associated with the advertiser.

The advertiser list user interface may also include an "Add Advertiser" button 605, allowing the user to create a profile for a new advertiser that the user's agency is representing. By selecting or clicking on the "add advertiser" button 605, the user will be presented a form or will be directed to a web page presenting a form 606, as depicted in FIG. 6B, for adding an advertiser. The form presented for adding an advertiser 606 may include a plurality of fields that includes text boxes, drop-down menus, check text labels, scrolling boxes and the like.

FIG. 7A is a screenshot of the user interface presented to the user listing of brands 701 associated with their agency. The brand list 700 may also include information regarding whether the brand campaign is active 702, the advertiser associated with brand campaign 703, the industry associated with the brand 704, or any other piece of information associated with each advertiser in the list. The brand list user interface may also include an action button 705 for each brand. By selecting or clicking on the action button 705, the user can modify the information associated with the brand and/or modify information relating to the ad campaign associated with the brand.

The brand list user interface may also include an "add brand" button 706, allowing a user to create a profile for a new brand associated with one of the advertisers from the advertiser list. By selecting or clicking on the "add brand" button 706, the user will be presented a form or will be directed to a web page presenting a form 707, as depicted in FIG. 7B, for adding a brand associated with an already added advertiser. The form presented for adding a brand 707 may include a plurality of fields that includes text boxes, drop-menus, check text labels, scrolling boxes and the like.

Once the user has entered the desired information to create an advertiser and/or brand, the information can be saved to the account on a database by clicking the "Add Advertiser" 607 or "Add Brand" button 708, as depicted in FIGS. 6B and 7B.

Figure 8:
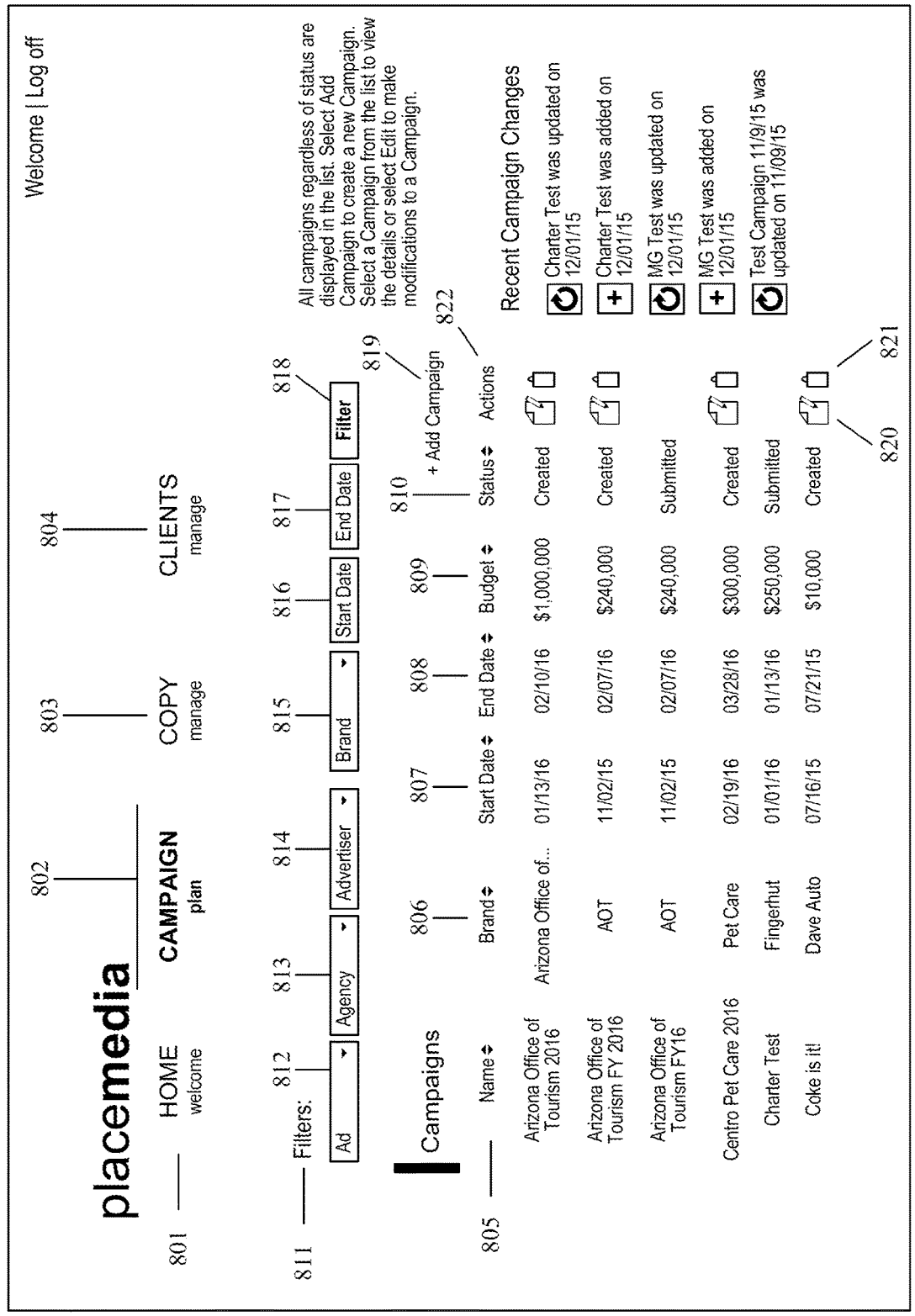
FIG. 8 illustrates a screenshot of a user interface used to manage ad campaigns.

FIG. 8 depicts a graphical user interface that is presented to a user. In one embodiment, once the user successfully completes the login, the user will be directed to another web page where a user interface may be displayed to the user that includes a list of campaigns associated with the user. The graphical user interface may also include a plurality of tabs, such as a Home tab 801, Campaign tab 802, Copy tab 803 and a Clients tab 804. When a user selects the Campaign tab 802, as depicted in FIG. 8, the user is presented a user interface listing the campaigns with which the user is associated. In one embodiment, when a user selects the Campaign tab, as depicted in FIG. 8, the user is presented a graphical user interface listing the campaigns associated with the agency 805. Information associated with the campaign may also be included in the list. For example, the brand 806, the start date 807, the end date 808, the budget 809 and the status 810 of the campaign may be included in the list. A user may be able to sort the list by any of the information associated with the list that was included. A user may also be able to filter the list of campaigns by account executive ("AE") 812, Agency 813, Advertiser 814, Brand 815, Start Date 816, or End Date 817.

A user may edit or delete a campaign listed by selecting an edit button 820 or a delete button 821 in the action column 822 associated with the campaign. When the user selects the edit button 820, information associated with the campaign will be displayed to the user in a modifiable format. When the user selects the delete button 821, the campaign will be deleted. A user may also add a new campaign by selecting the Add Campaign button 819. When the user selects the Add Campaign button 819, a form or a plurality of forms will be displayed to the user to gather information needed to generate the campaign.

Figure 9B:
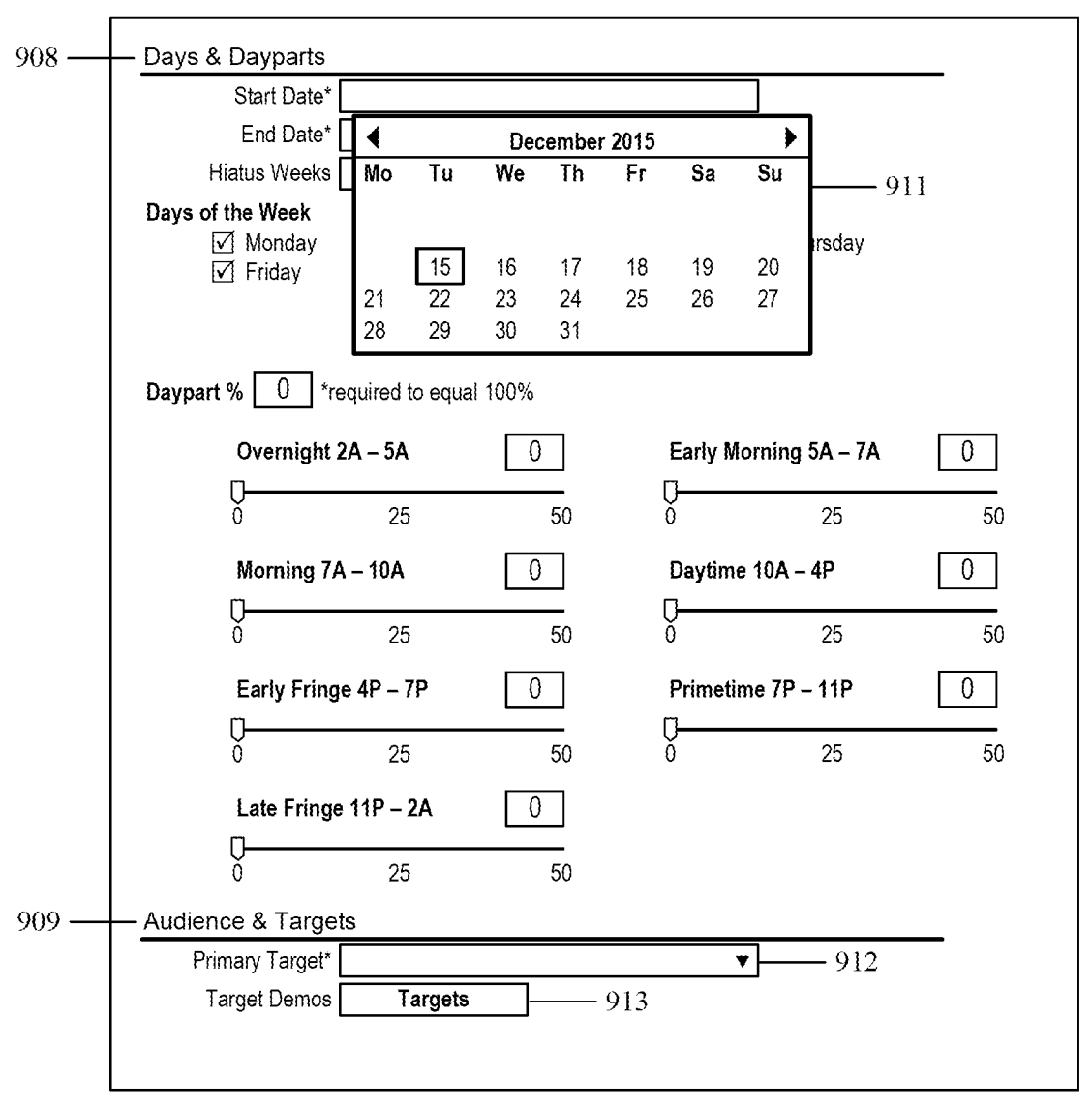
Figure 9C:
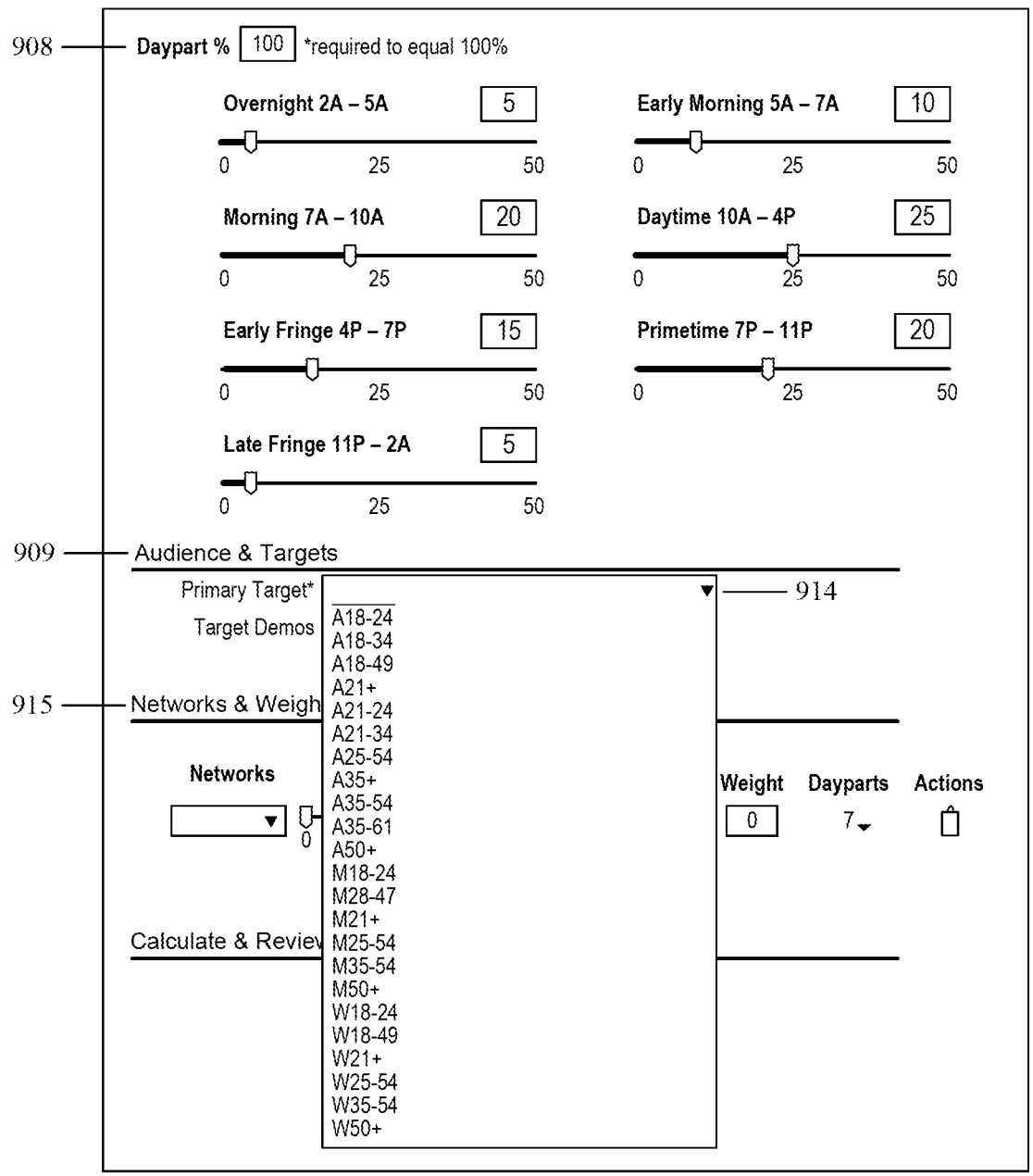

FIGS. 9A-9E depicts a graphical user interface 900 presented to a user when initially generating an ad campaign. The user is presented a graphical user interface having a form view, wherein the user is prompted to fill out all necessary information needed for a media plan to be generated. In one embodiment, text boxes are provided allowing the user to type in the information. In another embodiment, the form may include buttons, scrollbars, pulldown menus, pop-up menus, dialog boxes, etc. In one embodiment, the form view includes categories for the information being requested. For example, categories may include Account and Campaign information 907, Day and Dayparts 908, and Audience and Targets 909, as depicted in FIGS. 9A-9C. In one embodiment, critical information needed to generate the campaign are indicated by a text box followed by an (*).

In the Account and Campaign information category 907, depicted in FIG. 9A, basic information regarding the campaign is requested, such as campaign name, agency, advertiser, brand, campaign budget, distribution proportionality, and spot length 906.

In the Day & Dayparts information category 908, as also depicted in FIGS. 9A and 9B, the user must submit information regarding the start date and end date of the ad campaign 910 and 911. In one embodiment, when choosing a start and end date, or hiatus weeks, a user friendly calendar pops up 911. The user may also select seasons, days of the week, and/or parts of the day, referred to as dayparts), in which to run the ads. Additionally, the sum of all dayparts must add up to 100% which the programmatic advertisement platform calculates as each percent of the daypart is populated.

In the Audience and Target category 909, as depicted in FIGS. 9C and 9D, the user may select primary targets 912 for the ad campaign. For example, the ad campaign may be geared towards an audience of women, ages 25-30. In one embodiment, the user may manually enter in a target audience or may select from a list of primary targets 913. When choosing a primary target 912, as well as target demo 913, a drop down list of all available targets may appear 914.

In the Networks and Weights category 915, as depicted in FIGS. 9C and 9D, users are offered an option to create a "weighted campaign", where users can choose the networks, weight of network 916, and dayparts 917 they want n on for each specific network. Once all targets are chosen, the client can choose any genre or network exclusions they would like 918, as depicted in FIG. 9D. When chosen, those genres or networks will be automatically excluded 918.

Figure 9E:
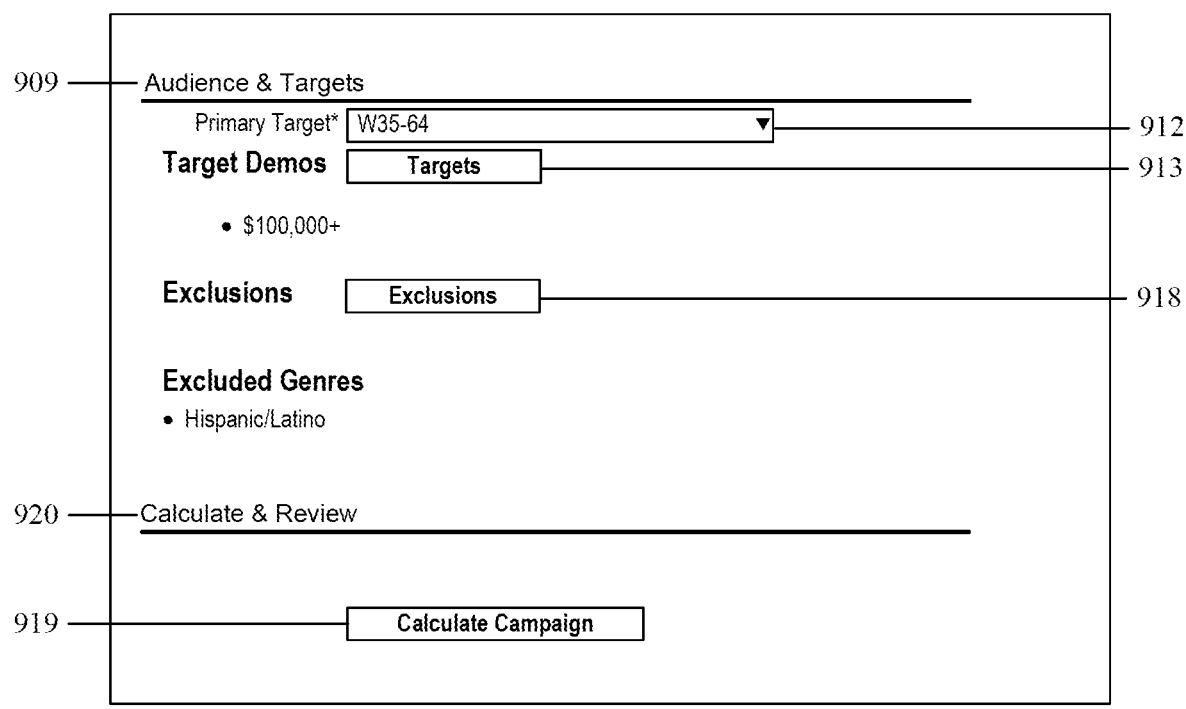

In the Calculate and Review category 920, as depicted in FIG. 9E, once the user has chosen their desired networks and populated each network with a weight, they can then calculate the campaign. When all information has been selected, the client can then click calculate campaign button 919 and their media plan will be generated.

Figure 10A:
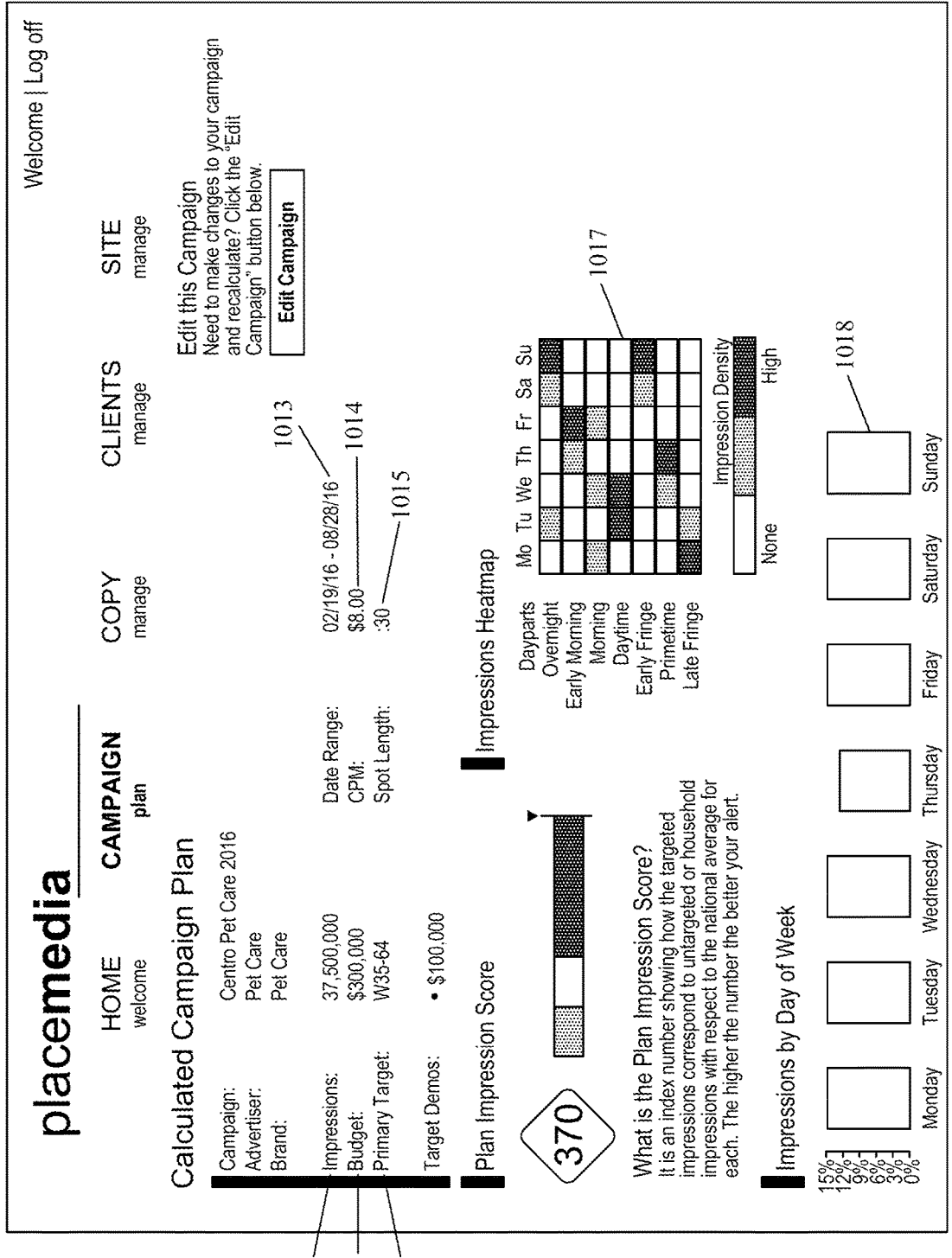
FIGS. 10A and 10B illustrate screenshots of a generated campaign ad campaign report.
Figure 10B:
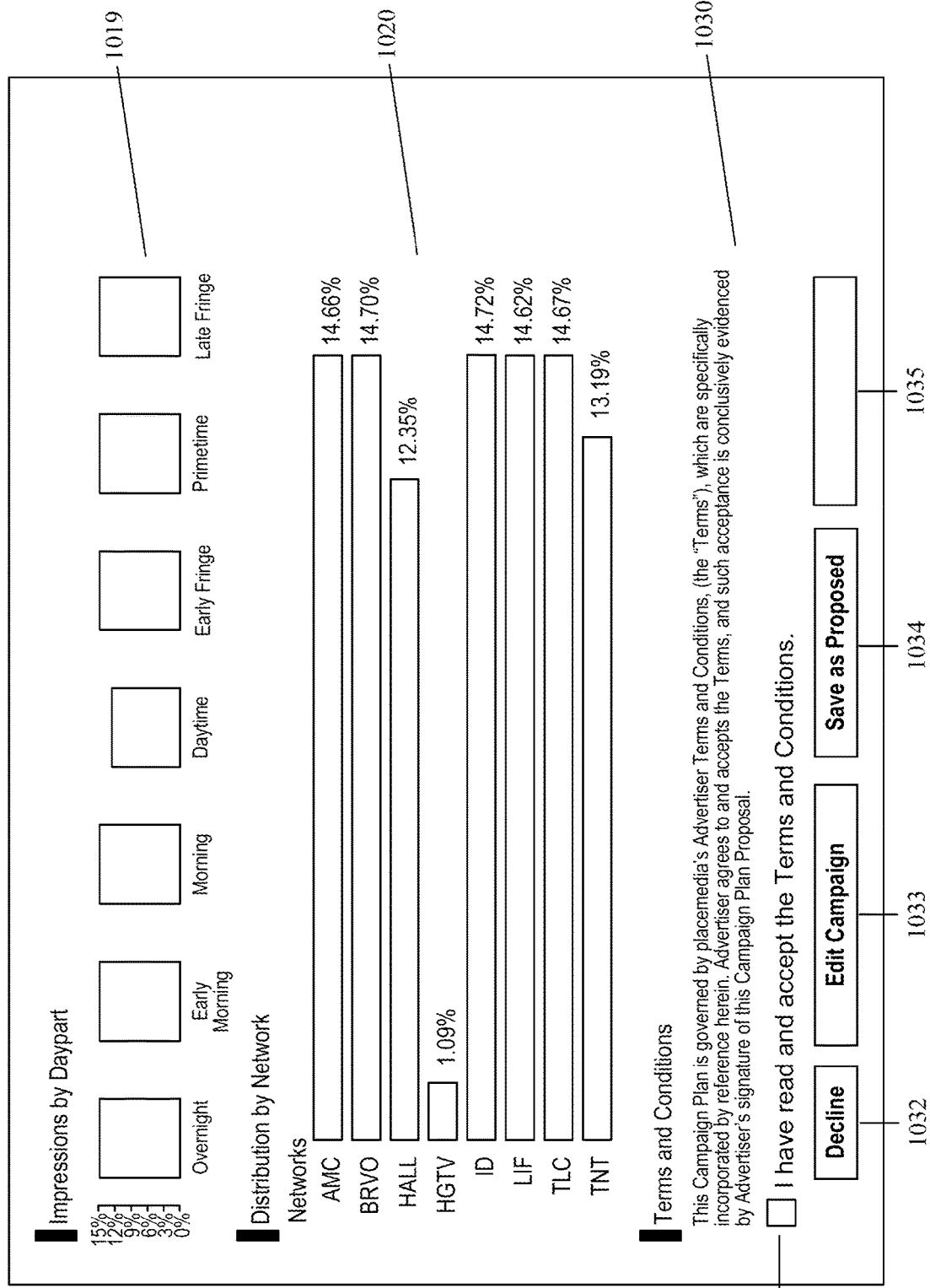

FIGS. 10A and 10B depict a generated campaign report that is displayed when the client has added all necessary information to create their desired media plan and t the media plan has been calculated. The calculated campaign report includes a campaign plan which may include the number of impressions 1010, a budget 1011, primary target 1012, start/end dates 1013, spot length 1015, CPM 1014, target demos 1015, etc. The calculated campaign report further may include a plan impression score 1016 which is an index number showing how the targeted impressions compare to the untargeted or household impressions with respect to the nation universal estimate for each demographic; an impression heatmap 1017; graphs displaying impressions by the day of the week 1018, impressions by daypart 1019, and/or distribution of the advertisements by network 1020; and agreements containing the terms and conditions governing the user, use of the programmatic advertisement platform and/or campaign 1030. After reviewing the generated campaign report, the client can choose to further edit the campaign plan by selecting or clicking on the edit campaign button 1033 or accept the terms and conditions associated with the use of the programmatic advertisement platform 1031 and submit the plan for approval 1035.

Once the campaign plan has been approved by the advertiser and the campaign has started, the advertiser can monitor the progress and/or effectiveness of the campaign. FIGS. 11A-11C depicts a campaign report after the campaign has started. In FIGS. 11A and 11B, the campaign report displays basic information related to the campaign 1110, such as the number of impressions, a budget, primary target, start/end dates, CPM, etc. The campaign report may also include information associated with impression goals 1120. For example, the campaign report may include daily household impressions, the daily household impression goal, likelihood of reaching the daily household impression goal, the total household impressions, the desired household impressions, and the percentage of the total household impressions delivered. The campaign report may also include graphs representing information related to impressions by the day of the week 1130, impressions by date 1140, and impressions by the network 1150, as depicted in FIG. 11B. In FIG. 11C, the campaign report depicts detailed data regarding the performance in a table format.

One of ordinary skill in the art can appreciate that a computer or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a stand-alone computing device, having programming language functionality, interpretation and execution capabilities.

In view of the foregoing, the scope of the present invention is determined by the claims that follow:

The invention claimed is:

1. A method, comprising:
creating, by one or more processors, a data set comprising viewership information, consumer data, and derived statistical information, wherein the viewership information describes viewing behavior on a plurality of set-top boxes, and wherein the consumer data indicates viewing behavior by one or more demographic attributes;
receiving, by the one or more processors, selection criteria comprising campaign dates, a target audience, a campaign budget, and advertising content;
determining, by the one or more processors, for each media asset in an inventory of media assets, a predicted performance value for placement of the advertising content in the media asset based on the data set, the selection criteria, and a demographic impression created using a demographic rating, a demographic universal estimate, a regional universal estimate, and a national universal estimate in the data set;
creating, by the one or more processors, an advertising campaign comprising one or more media assets from the inventory of media assets that are selected based on the predicted performance value determined for each media asset; and
displaying, by the one or more processors, a report of the advertising campaign comprising the predicted performance value for each of the one or more media assets and a plan impression score that compares the advertising campaign to the national universal estimate.

2. The method of claim 1, further comprising:
providing, by the one or more processors, an audience recommendation based on the selection criteria, wherein the audience recommendation comprises an additional segment to include in the advertising campaign.

3. The method of claim 1, the determining further comprising:
calculating, by the one or more processors, a success metric and a number of targeted impressions for placing the advertising content in the media asset, wherein the report further comprises the success metric and the number of targeted impressions.

4. The method of claim 1, wherein the target audience comprises an age range and a gender.

5. The method of claim 1, further comprising:
generating, by the one or more processors, after the advertising campaign starts, a campaign report comprising a number of impressions and campaign goals.

6. The method of claim 5, the displaying further comprising:
displaying, by the one or more processors, a heatmap in the campaign report that displays days of the week, times, and an impression density.

7. The method of claim 1, the determining the predicted performance value further comprising:
creating, by the one or more processors, the demographic impression by multiplying the demographic rating by the regional universal estimate to determine a result and multiplying the result by a ratio of the demographic universal estimate and the national universal estimate.

8. A system, comprising:
a memory; and
at least one processor coupled to the memory and configured to:
create a data set comprising viewership information, consumer data, and derived statistical information, wherein the viewership information describes viewing behavior on a plurality of set-top boxes, and wherein the consumer data indicates viewing behavior by one or more demographic attributes;
receive selection criteria comprising campaign dates, a target audience, a campaign budget, and advertising content;
determine for each media asset in an inventory of media assets, a predicted performance value for placement of the advertising content in the media asset based on the data set, the selection criteria, and a demographic impression generated using a demographic rating, a demographic universal estimate, a regional universal estimate, and a national universal estimate;

create an advertising campaign comprising one or more media assets from the inventory of media assets that are selected based on the predicted performance value determined for each media asset; and display a report of the advertising campaign containing the predicted performance value for each of the one or more media assets and a plan impression score that compares the advertising campaign to the national universal estimate.

9. The system of claim 8, the at least one processor further configured to:

provide an audience recommendation based on the selection criteria, wherein the audience recommendation comprises an additional segment to include in the advertising campaign.

10. The system of claim 8, the at least one processor further configured to:

calculate a success metric and a number of targeted impressions for placing the advertising content in the media asset, wherein the report further comprises the success metric and the number of targeted impressions.

11. The system of claim 8, wherein the target audience comprises an age range and a gender.

12. The system of claim 8, the at least one processor further configured to: generate, after the advertising campaign starts, a campaign report comprising a number of impressions and campaign goals.

13. The system of claim 12, the at least one processor further configured to:

display a heatmap in the campaign report that displays days of the week, times, and an impression density.

14. The system of claim 8, wherein to determine the predicted performance value the at least one processor is further configured to:

create the demographic impression by multiplying the demographic rating by the regional universal estimate to determine a result and multiplying the result by a ratio of the demographic universal estimate and the national universal estimate.

15. A non-transitory computer-readable device having instructions stored thereon that, when executed by at least one computing device, causes the at least one computing device to perform operations comprising:

creating a data set comprising viewership information, consumer data, and derived statistical information, wherein the viewership information describes viewing behavior on a plurality of set-top boxes, and wherein the consumer data indicates viewing behavior by one or more demographic attributes;

receiving selection criteria comprising campaign dates, a target audience, a campaign budget, and advertising content;

determining for each media asset in an inventory of media assets, a predicted performance value for placement of the advertising content in the media asset based on the data set, the selection criteria, and a demographic impression created using a demographic rating, a demographic universal estimate, a regional universal estimate, and a national universal estimate;

creating an advertising campaign comprising one or more media assets from the inventory of media assets that are selected based on the predicted performance value determined for each media asset; and displaying a report of the advertising campaign containing the predicted performance value for each of the one or more media assets and a plan impression score that compares the advertising campaign to the national universal estimate.

16. The non-transitory computer-readable device of claim 15, the operations further comprising:

providing an audience recommendation based on the selection criteria, wherein the audience recommendation comprises an additional segment to include in the advertising campaign.

17. The non-transitory computer-readable device of claim 15, the operations further comprising:

calculating a success metric and a number of targeted impressions for placing the advertising content in the media asset, wherein the report further comprises the success metric and the number of targeted impressions.

18. The non-transitory computer-readable device of claim 15, the operations further comprising:

generating after the advertising campaign starts, a campaign report comprising a number of impressions and campaign goals.

19. The non-transitory computer-readable device of claim 18, the operations further comprising:

displaying a heatmap in the campaign report that displays days of the week, times, and an impression density.

20. The non-transitory computer-readable device of claim 15, the determining the predicted performance value further comprising:

creating the demographic impression by multiplying the demographic rating by the regional universal estimate to determine a result and multiplying the result by a ratio of the demographic universal estimate and the national universal estimate.

* * * * *